United States Patent [19]

Saito et al.

[11] Patent Number: 4,999,260

[45] Date of Patent: Mar. 12, 1991

[54] MAGNETO-OPTICAL RECORDING MEDIUM COMPRISING A RARE-EARTH-TRANSITION METAL DISPERSED IN A DIELECTRIC

[75] Inventors: Ichiro Saito, Kawasaki; Yoichi Osato; Eiichi Fujii, both of Yokohama; Kozo Arao, Tokyo, all of Japan

[73] Assignee: Canon Kabushiki Kaisha, Tokyo, Japan

[21] Appl. No.: 246,970

[22] Filed: Sep. 21, 1988

Related U.S. Application Data

[63] Continuation of Ser. No. 117,444, Nov. 3, 1987, abandoned, which is a continuation of Ser. No. 736,757, May 22, 1985, abandoned.

[30] Foreign Application Priority Data

| May 31, 1984 | [JP] | Japan | 59-109618 |
| May 31, 1984 | [JP] | Japan | 59-109619 |
| Jul. 2, 1984 | [JP] | Japan | 59-135335 |
| Jul. 9, 1984 | [JP] | Japan | 59-140468 |
| Jul. 11, 1984 | [JP] | Japan | 59-142278 |
| Jul. 11, 1984 | [JP] | Japan | 59-142281 |

[51] Int. Cl.$^5$ .................................................. G11B 11/00
[52] U.S. Cl. .................................. 428/694; 428/900
[58] Field of Search ............... 428/694, 900, 928; 365/122; 369/13, 288; 360/131–135

[56] References Cited

U.S. PATENT DOCUMENTS

| 3,928,870 | 12/1975 | Ahrenkiel et al. | 252/62.51 |
| 4,414,650 | 11/1983 | Ohta et al. | 365/122 |
| 4,544,443 | 10/1985 | Ohta et al. | 156/643 |
| 4,664,977 | 5/1987 | Osata et al. | 428/336 |
| 4,675,767 | 6/1987 | Osata et al. | 360/131 |
| 4,683,176 | 7/1987 | Nakamura et al. | 428/900 |

FOREIGN PATENT DOCUMENTS

| 51296 | 5/1982 | European Pat. Off. |
| 92456 | 5/1984 | Japan |
| 589627 | 1/1978 | U.S.S.R. |

OTHER PUBLICATIONS

Cohen et al., "Material for Magneto-Optic Memories", RCA Review, vol. 33, Mar. 1972, p. 55.

Primary Examiner—George F. Lesmes
Assistant Examiner—Dennis V. Carmen
Attorney, Agent, or Firm—Fitzpatrick, Cella, Harper & Scinto

[57] ABSTRACT

A magneto-optical recording medium having at least one of a transition metal and a rare earth metal dispersed in a dielectric material and having an easy axis of magnetization normal to a film plane.

15 Claims, 3 Drawing Sheets

MAGNETO-OPTICAL RECORDING MEDIUM COMPRISING A RARE-EARTH-TRANSITION METAL DISPERSED IN A DIELECTRIC

This application is a continuation of application Ser. No. 117,444, filed Nov. 3, 1987, now abandoned, which in turn, is a continuation of Ser. No. 736,757, filed May 22, 1985, now abandoned.

BACKGROUND OF THE INVENTION

1. Field of the Invention

The present invention relates to a magneto-optical recording medium for recording, reproducing and erasing information by a laser beam.

2. Description of the Prior Art

As a computer technology has been developed, a huge volume of information must be processed. A high density and high capacity optical memory is one of many technical factors which support such information processing.

Practical recording methods now available include a method for irradiating a laser beam onto a record disk to form pits and a method for changing an optical characteristic such as a reflection factor.

However, those methods are limited to reproduction only or addition of recorded information. A medium which allows erasure of information and recording of new information has not been available.

The present invention relates to a magneto-optical record medium which can be used as an element to allow recording, erasing and recording of information.

Reproducing methods of a magneto-optical record medium include a method which utilizes a Faraday effect and a method which includes a Kerr effect. The magneto-optical recording medium which is used in those methods has an advantage described above but a disadvantage of low reproduced signal level. In the Kerr effect reproduction system, a high signal to noise ratio (S/N) is difficult to attain because of a small Kerr rotation angle. In order to increase the Kerr rotation angle, a magnetic material must be improved or a dielectric thin film such as SiO or $SiO_2$ is formed on the record medium to utilize multiple reflection onto a magnetic layer. As shown in Japanese Patent Application Laid-Open Nos. 6541/1980 and 6542/1983, an amorphous thin film is used and a metal reflection layer is formed on a backside so that the Kerr effect and the Faraday effect are utilized to increase the Kerr rotation angle. It is reported that the Kerr rotation angle is increased by forming a transparent dielectric film between the amorphous magnetic layer and the reflection layer with optimum selection of the materials and the thicknesses of those three layers. (J. Appl. Phys. Vol. 53 No. 6 pages 4485–4494).

However, in those methods, the film thickness of the amorphous magnetic film must be less than 250 Å in order to allow transmission of a readout light. If the record medium is left in a high temperature and high humidity environment in the presence of oxygen, the amorphous magnetic layer is readily oxidized and this results in reduction of a recording sensitivity of the medium, increase of error in recording and reproducing information and degradation of the signal.

SUMMARY OF THE INVENTION

It is an object of the present invention to provide a magneto-optical record medium which has an improved signal to noise ratio (S/N) and an excellent stability of conservancy (i.e. stability at high temperature and high humidity).

The above object of the present invention is achieved by the magneto-optical record medium having at least one of a transition metal and a rare earth metal dispersed in a dielectric material and having an easy axis of magnetization normal to a film plane.

DETAILED DESCRIPTION OF THE PREFERRED EMBODIMENTS

The magneto-optical record medium of the present invention is characterized by a magnetic record layer having at least one of a transition metal and a rare earth metal dispersed in a dielectric material. The record layer is formed to have an easy axis of magnetization normal to a film plane. The dielectric material used in the present invention consists of at least one element selected from a group consisting of AlN, $Si_3N_4$, $MgF_2$, $BiF_3$, SiO, $SiO_2$, $TiO_2$ and $Ta_2O_5$. The transition metal is selected from Fe, Co, Ni and the rare earth metal is selected from Gd, Tb, Dy. Proportion (volume ratio q) of the rare earth metal or the transition metal contained in the dielectric material is preferably $0.5 \leq q \leq 0.95$. If the volume ratio is less than 0.5, magnetization having perpendicular anisotropy of magnetization is not stable, and if q is larger than 0.95, the magnetic record layer is easily magnetized by oxygen or humidity.

The magnetic record layer of the medium of the present invention uses the above materials and is formed by sputtering method, vacuum deposition method (resistive heating method, electronic beam vapor deposition method) or ion plating method.

The magneto-optical record medium of the present invention is now explained with reference to the drawings.

Figures 1, 2, 3:
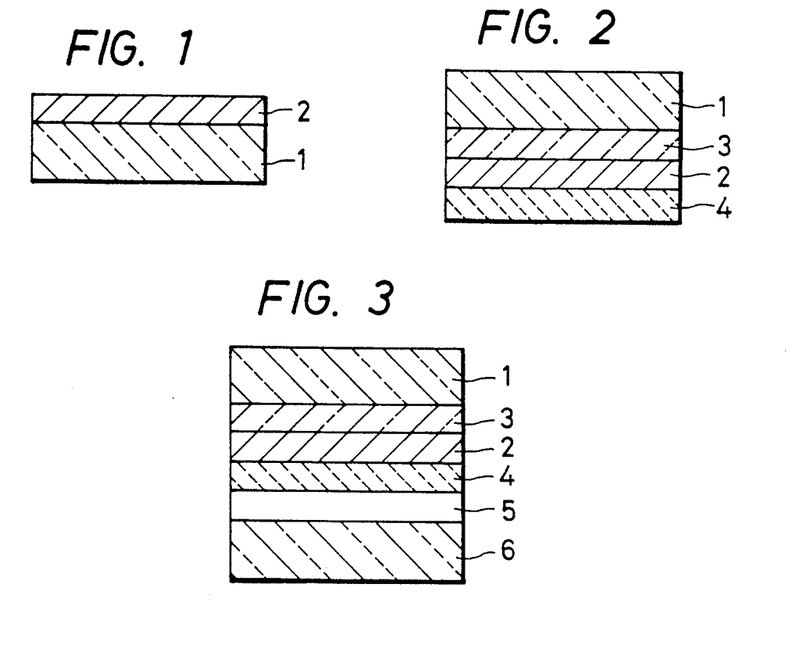
FIGS. 1 to 3 are sectional views of embodiments of magneto-optical record medium in accordance with the present invention.

FIG. 1 is a sectioned view of one embodiment of the present invention. Numeral 1 denotes a transparent substrate made of plastic or glass, and numeral 2 denotes a magnetic record layer. A laser beam is irradiated onto the magnetic record layer 2 to record information and the information is reproduced by utilizing a magnetic Kerr effect.

FIG. 2 shows an embodiment having an anti-reflection layer and a protection layer. Numeral 1 denotes a light-transmissive substrate, numeral 3 denotes the anti-reflection layer, numeral 2 denotes a magnetic record layer and numeral 4 denotes the protection layer. The anti-reflection layer 3 is a dielectric material having a thickness selected to minimize a reflection factor on a surface of the magnetic record medium 2. An energy of a laser beam is efficiently imported to the magnetic record layer 2 to improve a recording sensitivity. The protection layer 4 is made of organic high molecular film, inorganic material such as oxide or sulfide or metallic material and has an effect to improve conservancy stability of the magnetic record layer 2. As shown in FIG. 3, a protective substrate 6 may be bonded by an adhesive layer 5. The magnetic record layers may be formed on both sides to allow recording and reproducing of information on both sides of the magneto-optical record medium.

In FIGS. 2 and 3, the laser beam is irradiated onto the substrate 1 to record information and the information is reproduced by utilizing the magnetic Kerr effect.

Specific examples of the magneto-optical record medium of the present invention are explained below.

[Example 1]

A magnetic record layer having cobalt Co dispersed in silicon monoxide SiO was formed on a slide glass substrate of 76×26 mm size and 1 mm thick. The film was formed by an ion plating method having two vapor deposition sources Co and SiO. A volume ratio (q) of Co in SiO was 0.65 and the film thickness was approximately 1.0 μm.

A He-Ne laser beam having a wavelength of 633 nm and an output of 5 mW was irradiated onto the magnetic record layer of the magneto-optical record medium, and an external magnetic field was changed by an electromagnet and a hysteresis curve was measured. A coercive force was approximately 3.5 KOe. A Kerr rotation angle was measured under a magnetic field of 10 KOe. Ok was 1.2°.

[Example 2]

A zirconia $ZrO_2$ thin film having a thickness of approximately 800 Å which served to prevent reflection for a He-Ne laser beam having a wavelength of 633 nm was formed on a disk-shaped glass substrate having a diameter of 200 mm and a thickness of 1.5 mm by an electron beam vapor deposition method. A SiO—Co magnetic record layer was formed thereon in a similar method to that of the Example 1. The volume ratio (q) of Co in SiO was 0.65 and the film thickness was approximately 1.0 μm. A SiO protection layer having a film thickness of approximately 4000 Å was formed thereon by the electron beam vapor deposition method. A glass protective plate was bonded thereto by an adhesive material.

A laser beam was irradiated onto the glass plate of the magneto-optical record medium to record and reproduce information. A He-Ne laser having an output of 30 mW was used as a light source and a biasing magnetic field was applied normally to the plane of the magnetic record layer. The magnetic record layer was uniformly magnetized while the disk was rotated at 1000 rpm and the laser beam was pulsed to record a signal having a frequency of 2 MHz as pits. The biasing magnetic field applied was 1.5 KOe. The record was reproduced by a He-Ne laser beam having an output of 15 mW and a signal of approximately 90 mV was reproduced.

Figure 4:
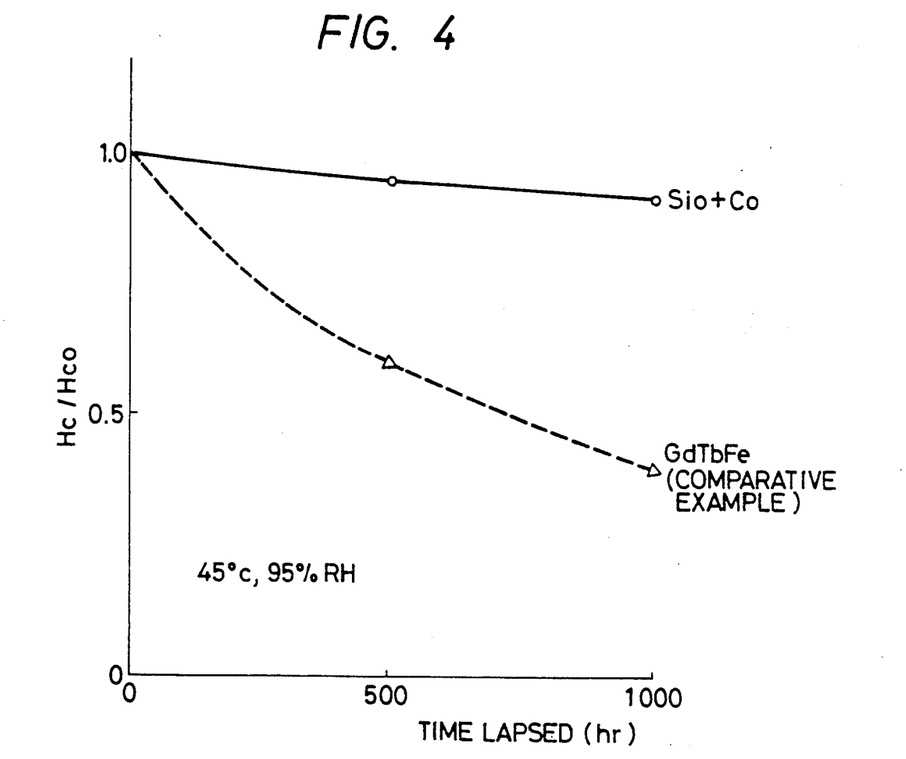
FIG. 4 shows a change of a coercive force with time in an anticorrosion test in one embodiment of the present invention.

The magnetic record medium was left in an environment of 45° C. in temperature and 95% RH in humidity and a change of a coercive force with time was measured to test the conservancy stability. FIG. 4 shows the change of the coercive force Hc to an initial coercive force Hco by Hc/Hco.

[Comparative Example 1]

Magneto-optical record medium having conventional GdTbFe amorphous thin films with various GdTbFe compositions and various thicknesses were prepared and the conservancy stabilities thereof were tested in the same manner as the Example 2. A result is shown in FIG. 4.

The coercive force of the magneto-optical record medium having the conventional GdTbFe amorphous thin film in the Comparative Example 1 remarkably reduced with time. On the other hand, the coercive force of the magneto-optical record medium of the present invention reduces very little with time and the conservancy stability is high.

In the magneto-optical record medium of the present invention, the S/N ratio is improved by forming a reflective layer on one side of the magneto-optical record layer and utilizing the Faraday effect as well. In this case, the thickness of the magnetic record layer should be selected to enable detection of a light transmitted through the record layer and reflected by the reflection film. An optimum film thickness is usually 250-1000 Å although it varies depending on the type of the rare earth metal or the transition metal and the volume ratio. The reflection film used in the magneto-optical record medium of the present invention is preferably made of Au, Ag, Cu or Al, has a film thickness of 300-800 Å and is formed by the electron beam vapor deposition method.

Figure 5:
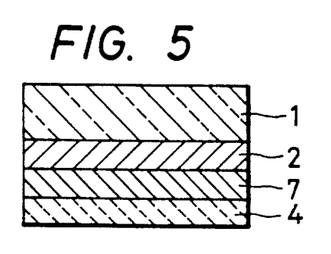
FIGS. 5 and 6 are sectional views of other embodiments of the magneto-optical record medium of the present invention.

An embodiment having such a reflection layer is now explained. FIG. 5 shows a sectional view of such embodiment. Numeral 1 denotes a light transmissive substrate made of plastic or glass. Numeral 2 denotes a magnetic record layer, numeral 7 denotes a reflection layer and numeral 4 denotes a protection layer. The protection layer 4 may be an organic high molecular film and may be formed by an application method, or it may be made of inorganic or metal material and may be vapor deposited.

In reproducing information, a laser beam is irradiated onto the substrate 1. A portion of the laser beam is reflected by the surface of the magnetic record layer 2 and the remaining portion transmits through the magnetic record layer 2 and is reflected by the reflection layer 7. The former reflected layer is subjected to the Kerr effect while the latter reflected light is subjected to the Faraday effect. Accordingly, an apparent Kerr rotation angle of the detection light which is a combination of those reflected lights increases. As a result, the signal to noise ratio (S/N) obtained when the laser beam is irradiated to the magneto-optical record medium is improved.

The Kerr rotation angle can be increased by forming a dielectric layer such as SiO or $SiO_2$ between the magnetic record layer 2 and the substrate 1.

Figure 6:
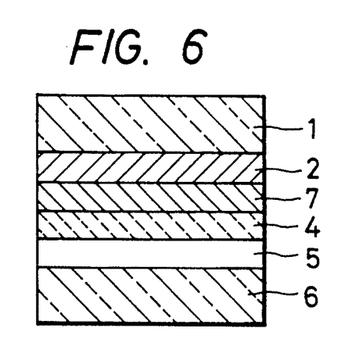

As shown in FIG. 6, the protection layer 6 may be bonded by an adhesive layer 5.

The magnetic record layers may be formed on both sides of the record medium to allow recording and reproducing of information on both sides of the magneto-optical record medium.

Specific examples of the magneto-optical record medium having the reflection layer are now explained.

[Example 3]

A magnetic record layer having Cobalt Co dispersed in silicon monoxide SiO was formed on a slide glass of 76×26 mm size and 1 mm thick. It was formed by Si-O—Co two-system ion implantation method in plasma. A volume ratio q of Co in SiO was 0.60 and a film thickness was approximately 450 Å. Cu reflection layer having a thickness of 400 Å was formed thereon by an electron beam vapor deposition method, and then a SiO protection layer having a film thickness of 4000 Å was formed by the ion plating method. A He—Ne laser beam having a wavelength of 633 nm and an output of 5 mW was irradiated onto the glass of the magneto-optical record medium and a hysteresis was measured while an external magnetic field was changed by an electromagnet. A coercive force was approximately 3 KOe.

[Example 4]

A SiO—Co magnetic record layer was formed on a disk-shaped glass substrate having a diameter of 200 mm and a thickness of 1.5 mm in a similar manner to that of Example 3. A volume ratio of Co contained in SiO was 0.6 and a film thickness was 450 Å. A Cu reflection layer having a film thickness of 420 Å was formed thereon by the electron beam vapor deposition method, and a SiO protection layer having a film thickness of 4000 Å was formed by the ion plating method. A glass protection plate was bonded thereto by an adhesive material to complete the magneto-optical record medium.

Information was recorded and reproduced by an optical head on the glass of the magneto-optical record medium. A He—Ne laser having an output of 30 mW was used as a light source and a biasing magnetic field was applied normally to the plane of the magnetic record layer. The disk-shaped magneto-optical record medium was rotated at 1000 rpm and the magnetic record layer was uniformly magnetized, and the laser was pulsed to record 2 MHz signal as pits. The biasing magnetic field applied was 1 KOe. In reproducing the information, a He-Ne laser having an output of 15 mW was used. A reproduced signal was approximately 100 mV.

[Example 5]

A SiO—Co magnetic record layer was formed on a disk-shaped glass substrate having a diameter of 200 mm and a thickness of 1.5 mm in a similar manner as that of Example 3. A volume ratio of Co contained in SiO was 0.65 and a film thickness was 400 Å. A SiO dielectric layer was formed thereon to a thickness of 400 Å by the ion plating method, and a Cu reflection layer was formed to a thickness of 400 Å by the electron beam vapor deposition method. Then, a SiO protection layer having a thickness of 4000 Å was formed thereon by the ion plating method and a glass protection layer was bonded thereto to complete the magneto-optical record medium Information was recorded and reproduced on the record medium in a similar manner to that of Example 4. When a recording frequency was 2 MHz, a reproduced signal was approximately 150 mV.

The magneto-optical record medium was left in an environment of 45° C. in temperature and 95% RH in humidity, and a change of coercivity with time was measured to test the conservancy stability. A result is shown in FIG. 4.

In the above embodiments, only the transition metal is dispersed in the dielectric material. The Kerr rotation angle is further increased by dispersing rare earth-transition metal in the dielectric material. The magnetic record layer has a rare earth-transition metal such as TbFeCo, GdTbFe, TbDyFe, GdDyFe, GdTbFeCo dispersed into AlN, $Si_3N_4$, $MgF_2$, $BiF_3$, SiO, $SiO_2$, $TiO_2$, $Ta_2O_5$ or combination thereof and has an easy axis of magnetization normal to the film plane. A volume ratio q of the rare earth-transition metal contained in the dielectric material is preferably $0.5 < q < 0.95$. If the volume ratio is less than 0.5, magnetization having vertical anisopropy of magneticism is not stable. If q is larger than 0.95, the magnetic record layer is easily oxidized by oxygen or humidity. The record layer is formed by the above materials by sputtering method, or vapor deposition method (resistive heating method, electron beam vapor deposition method). The structures may be identical to those shown in FIGS. 1–3, 5 and 6.

Specific examples of the magnetic record medium having the record layer having the rare earth-transition metal dispersed in the dielectric material are now explained.

[Example 6]

Zirconia $ZrO_2$ serving as an anti-reflection layer was formed to a thickness to prevent reflection on a glass substrate having a diameter of 200 mm and a thickness of 1.5 mm by the electron beam vapor deposition method. A film thickness was approximately 1000 Å for a semiconductor laser wavelength of 820 nm to be used. A magnetic record layer having GdTbFe dispersed in silicon monoxide SiO was formed by a two-system sputtering method having a composite target of Gd-Tb rare earth tips arranged on a Fe target, and a SiO target. A volume ratio of GdTbFe contained in SiO was 0.90 and a film thickness was approximately 1500 Å. A SiO protection layer was formed to a thickness of approximately 4000 Å by the electron beam vapor deposition method to form the magneto-optical record medium having the structure shown in FIG. 2.

Information pits were recorded and reproduced on the glass substrate of the magneto-optical record medium by an optical head. A recording optical head uses a semiconductor laser (wavelength of 820 nm) having an output power of 20 mW as a light source and irradiates a spot of a small diameter (1.2 μm) onto the surface of the magnetic record layer. An electromagnet was arranged to apply a biasing magnetic field normally to the plane of the magnetic record layer. The disk was rotated at 1800 rpm and the magnetic record layer was uniformly magnetized. The laser was pulsed to record a 4 MHz signal as pits. The biasing magnetic field applied was 200 Oe. A semiconductor having an output power of 10 mW was used to reproduce the information. A reproduction S/N was 32 dB in a bond of 30 KHz. The magneto-optical record medium was then bonded to a protection glass plate by an adhesive layer to form the magneto-optical record medium shown in FIG. 3. The magneto-optical record medium was left in a constant temperature/humidity chamber kept at 45° C. and 95% RH and the recording and reproducing characteristics after 500 hours and 1000 hours were measured. Results are shown in Table 1.

Table 1 shows changes in time of the reproduction S/N at 4 MHz and Hc/Hco, where Hco is an initial coercive force of the medium, Hc is a coercive force after a predetermined time has elapsed and Hc/Hco is a change of the coercive force.

[Comparative Example 2]

A magneto-optical record medium was formed in the same manner as that of Example 6 except that the magnetic record layer in Example 6 was substituted by GdTbFe film having a thickness of approximately 1200 Å and having no dielectric material.

Information was recorded and reproduced on the magneto-optical record medium in the same manner as that of Example 6. A biasing magnetic field in recording the information was 160 Oe. The reproduction S/N for a recording frequency of 4 MHz was 34 dB in a bond width of 30 KHz.

The magneto-optical record medium was then bonded to a protection glass substrate in a similar manner to that of Example 6. The magneto-optical record medium was left in the constant temperature/humidity chamber kept at 45° C. and 95% RH and the recording characteristics after 500 hours and 1000 hours were measured. Results are shown in Table 1.

[Examples 7-15]

Magneto-optical record media having magnetic record layers of materials and thicknesses shown in Table 1 were formed in a similar manner to that of Example 6.

The magneto-optical record media were then left in the constant temperature/humidity. Chamber kept at 45° C. and 95% RH and the recording characteristics after 500 hours and 1000 hours were measured. Results are shown in Table 1.

In the record medium of the Comparative Example 2, the reproduction S/N decreases with time. It decreases by approximately 40% after 1000 hours. The coercive force decreases by approximately 60%. In the magneto-optical magnetic media of the present invention, the decreases in time of the reproduction S/N and the coercive force are small. The decrease of the reproduction S/N after 1000 hours is several dB and the decrease of the coercive force is less than 10%. Thus, the conservancy stability is excellent.

was 0.85. A SiO protection layer having a thickness of approximately 4000 Å was formed thereon by the electron beam vapor deposition method, and a glass protection plate was bonded thereto by an adhesive material.

Figure 7:
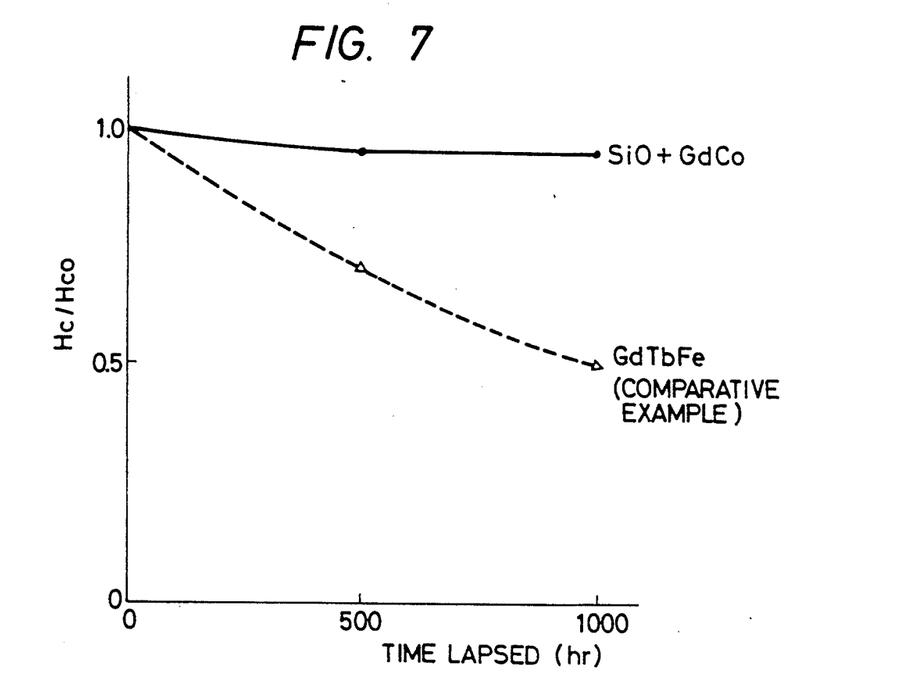
FIG. 7 shows a change of coercive force with time in an anticorrosion test in another embodiment of the present invention.

A laser beam was irradiated onto the glass of the magneto-optical record medium to record and reproduce information. A He-Ne laser having an output power of 30 mW was used as a light source and a biasing magnetic field was applied normally to the plane of the magnetic record layer. The disk was rotated at 1000 rpm and the magnetic record layer was uniformly magnetized. The laser was pulsed to record a 2 MHz signal as pits. The biasing magnetic field applied was 1.5 KOe. The recorded information was reproduced by a He-Ne laser having an output power of 15 mW. A reproduced signal was approximately 400 mW. The magneto-optical record medium of the present invention was left in an environment of 45° C. in temperature and 95% RH in humidity for a conservancy stability test. A result is shown in FIG. 7 in which Hc/Hco represents a change of a coercive force Hc relative to an initial coercive force Hco. In the conventional GdTbFe film (see broken line), the coercive force remarkably decreases with time. In the magneto-optical record medium of the present invention, the decrease of the coercive force is small and the conservancy stability is excellent.

[Example 17]

An amorphous magnetic record layer having a film thickness of 300 Å and having fine metal particles of GdTbFe dispersed in silicon monoxide SiO was formed on a glass substrate by a two-system sputtering method using a GdTbFe composite target having Gd-Tb rare earth metal tips arranged on an Fe target, and a SiO target. A volume ratio of GdTbFe in the amorphous magnetic record layer was approximately 0.85, and a transmission factor at 820 nm for the above film thickness was approximately 20%, a Cu reflection layer having a thickness of 400 Å was formed thereon by the electron beam vapor deposition method, and a SiO

TABLE 1

| | Magnetic Record Layer | | | | Reproduction S/N [dB] (at 4 MHz) - Hc/Hco (Hco:initial value) | | |
|---|---|---|---|---|---|---|---|
| | Magnetic material | Dielectric material | Volume Ratio | Thickness (Å) | Initial value | after 500 hours | after 1000 hours |
| Example 6 | GdTbFe | SiO | 0.9 | 1400 | 32-1.0 | 30-0.95 | 29-0.93 |
| Example 7 | GdTbFe | SiO | 0.85 | 1500 | 31-1.0 | 29-0.97 | 28-0.95 |
| Example 8 | TbFeCo | Si$_3$N$_4$ | 0.95 | 1300 | 35-1.0 | 33-0.98 | 33-0.96 |
| Example 9 | GdTbFeCo | Si$_3$N$_4$ | 0.90 | 1400 | 33-1.0 | 32-0.99 | 32-0.98 |
| Example 10 | TbDyFe | AlN | 0.85 | 1400 | 31-1.0 | 29-0.96 | 28-0.94 |
| Example 11 | GdTbFe | AlN | 0.80 | 1500 | 30-1.0 | 29-0.95 | 28-0.94 |
| Example 12 | GdTbFeCo | MgF$_2$ | 0.90 | 1400 | 32-1.0 | 30-0.97 | 29-0.96 |
| Example 13 | GdTbFe | MgF$_2$ | 0.85 | 1500 | 31-1.0 | 29-0.96 | 28-0.94 |
| Example 14 | TbFeCo | Ta$_2$O$_5$ | 0.90 | 1400 | 31-1.0 | 28-0.94 | 27-0.92 |
| Example 15 | GdDyFe | TiO$_2$ | 0.90 | 1400 | 30-1.0 | 28-0.93 | 26-0.90 |
| Comparative Example 2 | GdTbFe | — | — | 1200 | 34-1.0 | 25-0.60 | 20-0.4 |

[Example 16]

A Ta$_2$O$_5$ thin film having a thickness to prevent reflection was formed on a disk-shaped glass substrate having a diameter of 200 mm and a thickness of 1.5 mm by the electron beam vapor deposition method. A film thickness was set to approximately 720 Å for a He-Ne laser wavelength of 633 nm used. A magnetic record layer having a thickness of 2500 Å and having GdCo dispersed in SiO was formed thereon by a two-system sputtering method having a GdCo alloy target and a SiO target. A volume ratio of GdCo contained in SiO protection layer having a thickness of 3000 Å was formed by the electron beam vapor deposition method.

Information pits were recorded and reproduced on the magneto-optical record medium through the glass substrate by an optical head. A recording optical head was a semiconductor laser (820 nm) having an output power of 20 mW as a light source and irradiated a fine spot having a diameter of 1.2 μm onto the surface of the record layer. An electromagnet for applying a magnetic field normal to the plane of the record layer was arranged. The disk was rotated at 1800 rpm and the record layer was uniformly magnetized. The laser was pulsed to record a 4 MHz signal as pits. The recorded information was effected by a semiconductor laser having an output power of 10 mW by irradiating the laser beam to the glass substrate. The S/N was 35 dB in a bond width of 30 KHz.

A protection glass substrate was bonded by an adhesive layer. The magneto-optical record medium was left in a constant temperature/humidity chamber kept at 45° C. and 95% RH and recording and reproducing characteristics after 500 hours and 1000 hours were measured. Results are shown in Table 2.

[Comparative Example 3]

An amorphous magnetic record layer having a film thickness of approximately 160 Å was formed on a glass substrate by the sputtering method. A Cu reflection layer having a thickness of 400 Å was formed thereon by the electron beam vapor deposition method, and a SiO protection layer having a thickness of 3000 Å was formed thereon by the electron beam vapor deposition method. Information was recorded and reproduced through the glass substrate in the same manner as that of Example 17. The reproduction S/N at a recording frequency of 4 MHz was 36 dB.

The magneto-optical record medium was then bonded to a protection glass substrate by an adhesive layer in the same manner as that of Example 17. The magneto-optical record medium was left in a constant temperature/humidity chamber kept at 45° C. and 95% RH, and recording and reproducing characteristics after 500 hours and 1000 hours were measured. Results are shown in Table 2.

Figure 8:
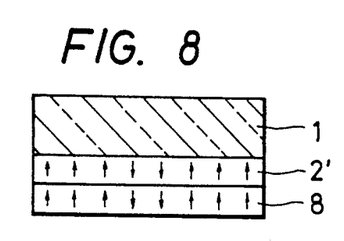
FIGS. 8 to 10 are sectional views of further embodiments of the magneto-optical record medium of the present invention.

Magnetic record media having magnetic record layers and reflection layers as shown in Table 2 were formed in the same manner as that of Example 17. The magnetic record media were left in the constant temperature/humidity chamber kept at 45° C. and 95% RH and recording and reproducing characteristics after 500 hours and 1000 hours were measured. Results are shown in Table 2.

force than the magnetic record layer and a magnetic anisotropy normal to the film plane.

FIG. 8 is a sectional view of a structure having such two magnetic layers. Numeral 1 denotes a light transmissive substrate made of plastic or glass and numeral 2' denotes a first magnetic layer having at least one metal element in a transition metal group or a rare earth metal group dispersed in a dielectric material and having an easy axis of magnetization normal to a thickness direction. For example, at least one metal element of the transition metal group such as Fe, Co, Ni or at least one metal element in the rare earth metal group such as Gd, Tb, Dy is dispersed into a dielectric material made of at least one compound selected from a group consisting of AlN, $Si_3N_4$, $MgF_2$, $BiF_3$, SiO, $SiO_2$, $TiO_2$ and $Ta_2O_5$. The metal to be dispersed may be a rare earth-transition metal consisting of an alloy of two or more elements such as TbFeCo.

A volume ratio q of the metal contained in the dielectric material is preferably $0.5 \leq q \leq 0.95$. If q is smaller than 0.5, a magnetization having a vertical magnetic anisotropy in the thickness direction is not stable. If q is larger than 0.95, the magnetic layer is easily oxidized in an oxygen or humidity environment. Within the preferable range of the volume ratio, the film thickness and the volume ratio are selected such that a light absorption factor of the first magnetic layer for a recording light is 30-40%. An optimum thickness is usually 250-1000 Å although it differs depending on a material of the magnetic layer and the volume ratio. The light absorption factor significantly affects to a recording and reproducing characteristic of the record medium, as will be discussed later.

The first magnetic layer 2' is formed on the substrate by sputtering method, ion plating method or electron beam vapor deposition method by using elements constituting the first magnetic layer 2' as vapor deposition sources with the preferable volume ratio, thickness and light absorption factor of the first magnetic layer 2' being taken into consideration.

Numeral 8 denotes a second magnetic layer having a higher coercive force than the first magnetic layer 2'

TABLE 2

| | Record Layer (A) | | | | Reflection Layer | | Reproduction S/N (at 4 MHz)dB | | |
|---|---|---|---|---|---|---|---|---|---|
| | Dielectric material | Rare Earth-Transition Metal (B) | Thickness (Å) | B/A by volume (%) | Material | Thickness (Å) | Initial Value | After 500 hours | After 1000 hours |
| Example 17 | SiO | GdTbFe | 300 | 85 | Cu | 320 | 38 | 35 | 33 |
| Example 18 | SiO | GdTbFeCo | 290 | 90 | Cu | 320 | 40 | 38 | 37 |
| Example 19 | AlN | TbFeCo | 300 | 85 | Cu | 320 | 37 | 35 | 34 |
| Example 20 | AlN | TbDyFe | 320 | 85 | Al | 350 | 37 | 36 | 35 |
| Example 21 | $Si_3N_4$ | GdTbFe | 320 | 85 | Al | 350 | 38 | 37 | 36 |
| Example 22 | $Si_3N_4$ | GdTbFeCo | 280 | 90 | Au | 330 | 37 | 36 | 36 |
| Example 23 | $MgF_2$ | TbFeCo | 350 | 90 | Au | 330 | 35 | 33 | 31 |
| Example 24 | $MgF_2$ | GdTbFe | 340 | 85 | Au | 330 | 36 | 33 | 32 |
| Example 25 | SiO | GdDyFe | 380 | 85 | Cu | 400 | 36 | 32 | 32 |
| Example 26 | SiO | TbFeCo | 360 | 90 | Cu | 400 | 37 | 35 | 34 |
| Comparative Example 3 | | GdTbFe | (160 Å) | — | Cu | 320 | 41 | 30 | 32 |

In the record medium of the Comparative Example, S/N decreases with time, and it decreases to approximately one half of the initial value after 1000 hours. On the other hand, in the record media of the present invention, S/N does not change with time and the conservancy stability is excellent.

In the present invention, a reproduced signal level is increased by laminating on the above magnetic record layer a second magnetic layer having a higher coercive and a magnetic anisotropy in the thickness direction. For example, it may be a metal film of at least one metal element selected from a transition metal group such as Fe, Co, Ni and a rare earth metal group such as Gd, Tb, Dy, a bariumferrite film ($BaFe_2O_4$), a cobalt-chromium alloy film (Co-Cr) or a manganese-bismuth alloy film (MnBi-MnCoBi).

The metal elements constituting the magnetic thin film and ferrite are used as vapor deposition sources and the second magnetic layer 8 is formed on the first magnetic layer 2' by sputtering method, ion ploting method or electron beam vapor deposition method. A thickness of the second magnetic layer 8 is preferably 500 Å–2000 Å although it varies depending on the material used.

Figure 9:
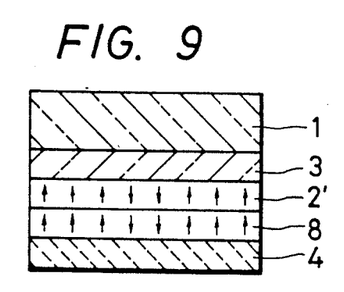
Figure 10:
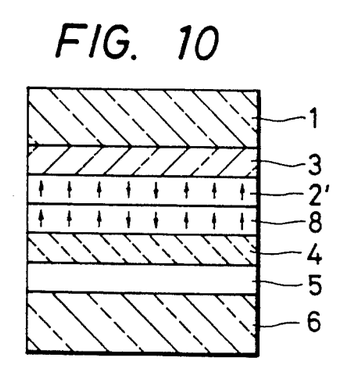

FIG. 9 is a sectional view of other embodiment. In the present embodiment, an anti-reflection layer 3 is formed between the substrate 1 and the first magnetic layer 2' of the magneto-optical record medium shown in FIG. 8 and a protection layer 4 is formed on the second magnetic layer 8. The anti-reflection layer 3 is a dielectric material having a thickness to minimize a reflection factor on the surface of the first magnetic layer. It is formed in the same manner as that of the magnetic layer. The anti-reflection layer 3 serves to decrease the reflection factor on the surface of the first magnetic layer when a laser beam is irradiated thereto so that the laser beam is efficiently applied to the magnetic layer.

The protection layer 4 is made of an organic high molecular film, or an inorganic material or metal material such as oxide or sulfide and it serves to improve the conservancy stability of the magnetic layer. The protection layer 4 may be formed by application method or plasma polymerizing method when the material is organic, and is formed in the same manner as that of the magnetic layer when the material is inorganic.

Pits thus recorded are reproduced by irradiating a laser beam onto the substrate 1 of the record medium and detecting a polarization angle of the reflected light.

A portion of the irradiated laser beam is reflected by the first magnetic layer 2' and other portion thereof transmits through the first magnetic layer 2' and is reflected by the second magnetic layer 8. Combination of those two reflected lights is detected. The laser beam reflected by the first magnetic layer 2' is subjected to the Kerr effect and the laser beam transmitted through the first magnetic layer 2' and reflected by the second magnetic layer 8 is subjected to the Faraday effect of the first magnetic layer 2' and the Kerr effect of the second magnetic layer 8. Since the combination of those reflected lights is detected, an apparent Kerr rotation angle increases and a reproduced signal level is increased.

If the second magnetic layer 8 has a low Curie point and the magnetization thereof may be reversed by the reproducing light, the structure is designed to prevent the reproducing light from reaching the second magnetic layer 8. In this case, the first magnetic layer 2' may be made of a material having a large Kerr rotation angle so that only the reflected light from the first magnetic layer 2' is detected.

The magneto-optical record medium of the present embodiment having the first and second magnetic layers allows stable pit recording without being affected by a biasing magnetic field applied when information is recorded, and has an excellent conservancy stability, as will be seen from the following examples.

Specific examples of the magneto-optical record medium of the present invention are now explained.

[Example 27]

A first magnetic layer having gadolinium, terbium and iron (Gd, Tb, Fe) dispersed in silicon monoxide (SiO) was formed on a slide glass substrate having a size of 76×26 mm and a thickness of 1 mm. It was formed by a two-system sputtering method using a composite target having Gd-Tb alloy (Gd-Tb composition is 50–50%) tips arranged on a Fe target, and a SiO target. A total volume ratio of Gd, Tb and Fe contained in SiO was 0.90 and a film thickness was 280 Å. A transmission factor of the first magnetic layer at a wavelength of 830 nm was 40%. A second magnetic layer of $Tb_{0.2}(Fe_{0.9}Co_{0.1})_{0.8}$ having a thickness of 600 Å was formed on the first magnetic layer by the sputtering method. A coercive force was approximately 2.5 KOe. A semiconductor laser beam having a wavelength of 830 nm and an output power of 25 mW was irradiated to the magneto-optical record medium through the substrate, and the Kerr rotation angle Ok was measured under the application of a magnetic field of 8 KOe normally to the thickness direction. Ok was approximately 1.2°.

[Example 28]

First and second magnetic layers were formed on a disk-shaped glass substrate having a diameter of 200 mm and a thickness of 1.5 mm, in the same manner as that of Example 27. A SiO protection layer having a thickness of approximately 4000 Å was formed thereon by the electron beam vapor deposition method, and a glass protection plate was bonded by an adhesive material to form the magneto-optical record medium.

A laser beam was irradiated to the magneto-optical record medium through the substrate to record information. A semiconductor laser having an output power of 25 mW and a wavelength of 830 nm was used as a light source and a biasing magnetic field was applied widthwise of the magnetic layer. The disk-shaped magneto-optical record medium was rotated at 1500 rpm and the magnetic layer was uniformly magnetized. The laser was pulsed to record a 2 MHz signal as pits. The biasing magnetic field applied was 0.5 KOe. The recorded pits were reproduced by a semiconductor laser having an output power of 10 mW. A reproduced signal was approximately 480 mV for the recording frequency of 2 MHz, and a signal waveform was good. A S/N was 48 dB in a bond width of 30 KHz. The biasing magnetic field was changed between 0.4–0.7 KOe and the recorded pits were observed by a microscope. Stable record pits were observed for various biasing magnetic fields. The magneto-optical record medium was left in an environment of 45° C. in temperature and 95% RH in humidity and a change of coercive force with time was measured to test the conservancy stability. The coercive force did not essentially decrease after 1000 hours and the conservancy stability is higher than that of the prior art magneto-optical record medium.

At least one metal element selected from Fe, Co and Ni and at least one metal element selected from Gd, Tb and Dy were dispersed in a dielectric material consisting of at least one of AlN, $Si_3N_4$, $MgF_2$, $BiF_3$, SiO, $SiO_2$, $TiO_2$ and $Ta_2O_5$ to form the first magnetic layer, and the metal thin film and ferrite thin film described above were used as the second magnetic layer to form various magneto-optical record media, and similar tests were made. The reproduced signal levels were high, the recorded pits were not affected by the biasing magnetic field and the conservancy stabilities were improved.

[Example 29]

A first magnetic layer having cobalt (Co) dispersed in silicon monoxide (SiO) was formed on a slide glass substrate having a size of 76 mm×26 mm and a thickness of 1 mm, by the ion plating method of SiO-Co two-system vapor deposition sources in plasma. A volume ratio of Co contained in SiO was 0.60 and a thickness was approximately 450 Å. A second magnetic layer of Tb, Dy, Fe thin film was formed thereon to a thickness of approximately 1000 Å by the sputtering method. A coercive force was approximately 3 KOe. A He-Ne laser beam having a wavelength of 633 nm and an output power of 20 mW was irradiated to the magneto-optical record medium through the substrate, and the Kerr rotation angle Ok was measured under the application of a magnetic field of 10 KOe normally to the thickness direction. Ok was approximately 1.0°.

[Example 30]

A zirconia thin film having a thickness of approximately 800 Å which serves as an anti-reflection film for a He-Ne laser wavelength of 633 nm used was formed on a disk-shaped glass substrate having a diameter of 200 mm and a thickness of 1.5 mm, by the electron beam vapor deposition method. First and second magnetic layers were formed thereon in the same manner as that of Example 29. A SiO protection layer having a film thickness of approximately 4000 Å was formed by the electron beam vapor deposition method, and a glass protection plate was bonded by an adhesive material to from the magneto-optical record medium.

A laser beam was irradiated to the magneto-optical record medium through the substrate to record information. A He-Ne laser having an output power of 20 mW was used as a light source and a biasing magnetic field was applied thicknesswise of the magnetic layer. The disk-shaped magneto optical record medium was rotated at 1000 rpm and the magnetic layer was uniformly magnetized. The laser was pulsed to record a 2 MHz signal as pits. The biasing magnetic field applied was 0.5 KOe. The recorded pits were reproduced by a He-Ne laser having an output power of 7 mW. A reproduced signal was approximately 300 mV for the recording frequency of 2 MHz, and a signal waveform was good. The biasing magnetic field was changed between 0.4–0.8 KOe and the recorded pits were observed by a microscope. The recorded pits were stable irrespective of the change of the biasing magnetic field. The magneto-optical record medium was left in an environment of 45° C. in temperature and 95% RH in humidity and a change of a coercive force with time was measured to test the conservancy stability. The coercive force did not essentially decrease after 1000 hours and the conservancy stability was excellent to compare with that of the prior art magneto-optical record medium.

At least one selected from Fe, Co and Ni or at least one selected from Gd, Tb and Dy was dispersed in a dielectric material consisting of at least one of AlN, $Si_3N_4$, $MgF_2$, $BiF_3$, SiO, $SiO_2$, $TiO_2$ and $Ta_2O_5$ to form the first magnetic layer and the metal thin film and the ferrite thin film described above were used as the second magnetic layer to form various magneto-optical record media and they were tested in the same manner. The reproduced signal levels were high, the recorded pits were not affected by the biasing magnetic field and the conservancy stabilities were improved.

What is claimed is:

1. A magneto-optical record medium comprising:
   a substrate; and
   a magnetic record layer formed on said substrate, said magnetic record layer being a rare earth-transition metal alloy dispersed in a dielectric material, said magnetic record layer having an easy axis of magnetization normal to a plane defined by said magnetic layer.

2. A magneto-optical record medium according to claim 1, wherein a volume ratio of said metal alloy in said dielectric material of said magnetic record layer is between 0.5 and 0.95.

3. A magneto-optical record medium according to claim 1, further comprising a reflection layer formed on said substrate.

4. A magneto-optical record medium according to claim 3, wherein said reflection layer is made of a metal thin film of Au, Ag, Cu or Al.

5. A magneto-optical record medium according to claim 3, wherein the thickness of said magnetic record layer is between 250 Å and 1000 Å.

6. A magneto-optical record medium according to claim 3, wherein the thickness of said reflection layer is between 300 Å and 800 Å.

7. A magneto-optical record medium according to claim 3, wherein said substrate is light transmissive and said reflection layer is formed on said magnetic record layer on the side thereof opposite said substrate.

8. A magneto-optical record medium according to claim 1, wherein said dielectric material is made of at least one of AlN, $Si_3N_4$, $MgF_2$, $BiF_3$, SiO, $SiO_2$, $TiO_2$ and $Ta_2O_5$.

9. A magneto-optical record medium comprising:
   a substrate;
   a first magnetic layer formed on said substrate, said first magnetic layer being a rare earth-transition metal alloy dispersed in a dielectric material, said first magnetic layer having an easy axis of magnetization normal to a plane defined by said first magnetic layer; and
   a second magnetic layer formed adjacent to said first magnetic layer, said second magnetic layer having a higher coercive force than said first magnetic layer and an easy axis of direction normal to the plane.

10. A magneto-optical record medium according to claim 9, wherein a volume ratio of the metal alloy in the dielectric material of said first magnetic layer is between 0.5 and 0.95.

11. A magneto-optical record medium according to claim 9, wherein the thickness of said first magnetic layer is between 250 and 1000 Å.

12. A magneto-optical record medium according to claim 9, wherein said second magnetic layer is made of a rare earth-transition metal alloy thin film.

13. A magneto-optical record medium according to claim 9, wherein a thickness of said second magnetic layer is between 500 Å and 2000 Å.

14. A magneto-optical record medium according to claim 9, wherein said first magnetic layer is a layer of Gd Tb Fe dispersed in SiO.

15. A magneto-optical record medium according to claim 9, wherein said substrate is light transmissive and said second magnetic layer is formed on said magnetic record layer on the side thereof opposite said substrate.

* * * * *

UNITED STATES PATENT AND TRADEMARK OFFICE
CERTIFICATE OF CORRECTION

PATENT NO. : 4,999,260

DATED : March 12, 1991

INVENTOR(S) : ICHIRO SAITO, et al

It is certified that error appears in the above-identified patent and that said Letters Patent is hereby corrected as shown below:

On the title page;

IN [56] REFERENCES CITED

Under U.S. PATENT DOCUMENTS, add
        --4,390,600  6/1983  Ohta et al.--.

Under FOREIGN PATENT DOCUMENTS, add
        --185052  10/1984  Japan--.

COLUMN 4

Line 24, "Åalthough" should read --Å although--.

COLUMN 5

Line 4, "Cu" should read --A Cu--.
    Line 55, "medium" should read --medium.--.

COLUMN 6

Line 6, "$0.5<q<0.95$" should read --$0.5 \leq q \leq 0.95$--.

COLUMN 7

Line 27, "temperature/humidity. Chamber" should read
        --temperature/humidity chamber--.

COLUMN 10

Line 66, "bariumferrite" should read --barium-ferrite--.
    Line 68, "MnBi-MnCoBi" should read --MnBi-MnCuBi--.

UNITED STATES PATENT AND TRADEMARK OFFICE
CERTIFICATE OF CORRECTION

Page 2 of 2

PATENT NO. : 4,999,260
DATED : March 12, 1991
INVENTOR(S) : ICHIRO SAITO, et al

It is certified that error appears in the above-identified patent and that said Letters Patent is hereby corrected as shown below:

COLUMN 11

Line 4, "ploting" should read --plating--.

COLUMN 13

Line 49, "to compare" should read --compared--.

COLUMN 14

Line 50, "250" should read --250 Å--.

Signed and Sealed this

Twenty-second Day of December, 1992

Attest:

DOUGLAS B. COMER

*Attesting Officer*     *Acting Commissioner of Patents and Trademarks*